(12) United States Patent
Subramaniam et al.

(10) Patent No.: US 9,378,272 B1
(45) Date of Patent: *Jun. 28, 2016

(54) DETERMINING CORRECTION OF QUERIES WITH POTENTIALLY INACCURATE TERMS

(71) Applicant: Google Inc., Mountain View, CA (US)

(72) Inventors: Krishnan R. Subramaniam, San Francisco, CA (US); Trystan G. Upstill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,534

(22) Filed: Sep. 19, 2014

Related U.S. Application Data

(63) Continuation of application No. 13/482,427, filed on May 29, 2012, now Pat. No. 8,868,587.

(60) Provisional application No. 61/642,595, filed on May 4, 2012.

(51) Int. Cl.
  *G06F 17/30* (2006.01)
  *G06F 15/16* (2006.01)

(52) U.S. Cl.
  CPC .... *G06F 17/30646* (2013.01); *G06F 17/30424* (2013.01)

(58) Field of Classification Search
  None
  See application file for complete search history.

(56) References Cited

U.S. PATENT DOCUMENTS

| | | | |
|---|---|---|---|
| 6,941,293 B1 | 9/2005 | Dean | |
| 7,440,941 B1 | 10/2008 | Borkovsky | |
| 2006/0069664 A1 | 3/2006 | Ling | |
| 2007/0038616 A1 | 2/2007 | Guha | |
| 2007/0100804 A1 | 5/2007 | Cava | |
| 2007/0198501 A1 | 8/2007 | Sundaranatha | |
| 2007/0214128 A1* | 9/2007 | Smith | G06F 17/3064 |
| 2008/0052277 A1 | 2/2008 | Lee | |
| 2009/0083255 A1 | 3/2009 | Li | |
| 2009/0094221 A1 | 4/2009 | Cameron | |

OTHER PUBLICATIONS

Chen et al., "Improving Query Spelling Correction Using Web Search Results" Proceedings of the 2007 Joint Conference on Empirical Methods in Natural Language Processing and Computational Natural Language Learning [online]. 2007, Prague pp. 181-189 [retrieved on May 29, 2012]. Retrieved from Internet electronic mail: http://www.aclweb.org/anthology-new/D/D07/D07-1019.pdf.

* cited by examiner

*Primary Examiner* — Alex Gofman
(74) *Attorney, Agent, or Firm* — Fish & Richardson P.C.

(57) ABSTRACT

Methods, systems, and apparatus, including computer programs encoded on a computer storage medium, for correcting potentially inaccurate terms in queries. In an aspect, a search system determines that an original query includes a potentially inaccurate term. The determination is made on the basis that the term of the original query meets an inaccuracy criterion. Derivative queries are generated from the original query. Each derivative query does not include the potentially inaccurate term. For each derivative query resources that are determined to be responsive to the derivative query are determined, and from the resources, a corrected term is determined. The corrected term is substituted for the potentially inaccurate term, and a search operation that uses the corrected query as input is performed.

18 Claims, 7 Drawing Sheets

DETERMINING CORRECTION OF QUERIES WITH POTENTIALLY INACCURATE TERMS

CROSS-REFERENCE TO RELATED APPLICATIONS

This application is a continuation application of, and claims priority to, U.S. patent application Ser. No. 13/482,427, titled "Determining Correction Of Queries With Potentially Inaccurate Terms," filed on May 29, 2012, which claims the benefit under 35 U.S.C. §119(e) of U.S. Patent Application No. 61/642,595, titled "Determining Correction Of Queries With Potentially Inaccurate Terms," filed on May 4, 2012. The disclosure of the foregoing applications are incorporated herein by reference in their entirety for all purposes.

BACKGROUND

This specification relates to search query processing.

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources to provide search results that link to the selected resources. The search results are typically ordered according to the scores and presented according to this order.

Many search systems implement query correction processes. As used herein, the term "query correction" is correction data for a query that is used to correct a term in a query that is determined to be an inaccurate term for that query. For some queries, however, query corrections can be difficult to determine.

SUMMARY

In general, one innovative aspect of the subject matter described in this specification can be embodied in methods that include the actions of receiving an original query from a user device, the query including a plurality of terms; determining that a term of the original query meets an inaccuracy criterion that is indicative of the term of the original query being a potentially inaccurate term in a context of the original query that is defined by the original query terms and in response: identifying the term as a potentially inaccurate term, generating one or more derivative queries from the original query, each derivative query not including the potentially inaccurate term, for each of the one or more derivative queries, submitting the derivative query for a search of a resource corpus and receiving data identifying resources that are determined to be responsive to the derivative query, determining a corrected term based on the identified resources responsive to the derivative query, wherein the corrected term is determined independent of a set of resources identified as being responsive to the original query, the corrected term is a term that is different from the potentially inaccurate term, generating a corrected query that includes the terms of the original query that are not the potentially inaccurate term and that includes the corrected term substituted for the potentially inaccurate term, performing a search operation that uses the corrected query as input; and providing results of the search operation to the user device in response to the original query.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The use of resources that are identified as being responsive to a derivative query that does not include the potentially inaccurate term facilitates the correction of query errors that are otherwise difficult to detect and, if detected, difficult to correct. In some implementations, each derivative query is constructed such that it does not include the potentially inaccurate term and is further evaluated based on the resources that are determined to be responsive to the candidate query. The selection and evaluation of each candidate query is independent of and does not rely on the resources that are determined to be responsive to the original query that includes the potentially inaccurate term. In this way, candidate corrections can be determined from a larger set and/or higher quality set of resources than would otherwise be available when the resources are dependent on the original query with the potentially inaccurate term.

The use of resources to determine query corrections also facilitates the correction of queries with many terms. Because a query with many terms provides many possible contexts, a larger number of sets of resources may be identified relative to a query with only two or three terms. The additional resource sets allows for a more robust term correction analysis that would otherwise be available when processing fewer sets of resources.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

Figure 1:
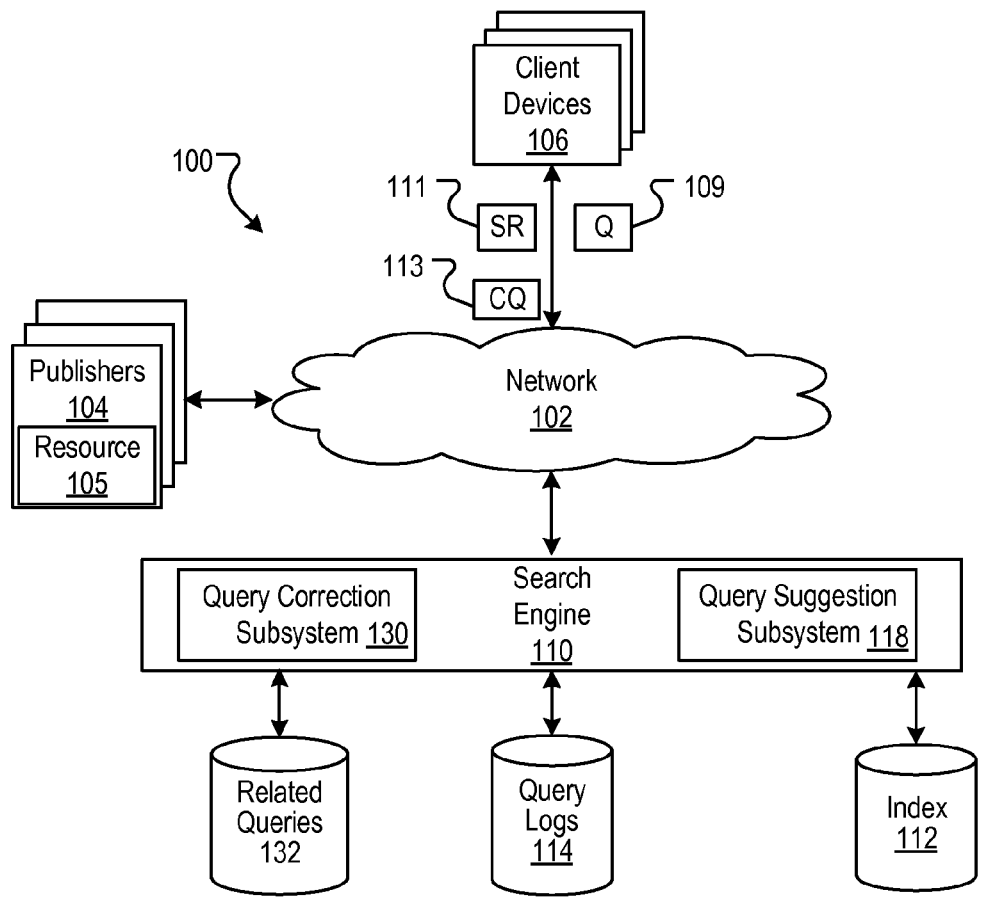
FIG. 1 is block diagram of an environment in which a search engine provides query corrections for queries with potentially inaccurate terms.

As described above, query corrections can be difficult to determine for particular types of queries. Such queries include unique queries, rarely occurring queries, class-instance queries, and queries with misspelled terms. Unique queries are queries that have not been received by a search engine before; they may result from misspelled terms, usage errors, or from the use of new words or terms that are emergent in a particular language. Rarely occurring queries, which are referred to as "long-tail" queries, are queries for which there is little history. As such, query correction processes that are based on historical analysis (e.g., query log history and search result selection history) may provide inadequate corrections. Class-instance queries are queries with terms that are an instance of a class of terms that are commonly confused but that in the context of the queries appear to be correct. For example, the letters of broadcast network identifiers are instances of the class of broadcast network identifiers, and are often confused by users. As such, a query with a broadcast network identifier is a class-instance query. Finally, a misspelled term may be in a term that is not in a term corpus (e.g., a dictionary or a query log), or may be a term that is, in fact, correctly spelled but is a homophone, e.g., carat and carrot. Queries with such misspelled terms often do readily map to a correctly spelled term given the context of the query.

This specification describes technologies relating to determining identifying potentially inaccurate terms in a query and selecting correction terms to substitute for the potentially inaccurate terms. In operation, a search system receives an original query from a user device. The original query includes multiple terms, and the terms define a query context. The search system determines that the original query includes a potentially inaccurate term. In some implementations, this determination is made on the basis that the term of the original query meets an inaccuracy criterion that is indicative of the term of the original query being a potentially inaccurate term in a context of the original query. There are several types of inaccuracy criteria that can be used, and the inaccuracy criteria may depend on the query error that results in the potentially inaccurate term. Examples of inaccuracy criteria are described in more detail in the sections below.

In response to a query including a potentially inaccurate term, the search system generates one or more derivative queries from the original query. Each derivative query does not include the potentially inaccurate term. The derivative query may include only the terms that are not the potentially inaccurate term, or, alternatively, may include substitute terms for the potentially inaccurate term. The content of the derivative query depends on the type of potentially inaccurate term identified.

For each of the one or more derivative queries, the search system processes resource data of resources that are determined to be responsive to the derivative query. The resource data for each resource includes the resource itself, and optionally the search score of the resource, the ranking of the resource relative to other resources in response to the search, and other resource metadata. From the resource data, a corrected term that is different from the potentially inaccurate term is selected. The corrected term is used to generate a corrected query. In the corrected query, the corrected term is substituted for the potentially inaccurate term. The corrected query is then used to perform a search operation, such as providing a suggestion to the user to use the corrected query, or providing search results identifying resources that are determined to be responsive to the corrected query.

These features are and additional features are described in more detail in the following sections.

Example Environment

FIG. 1A is a block diagram of an example environment 100 in which a search engine 110 provides query corrections for queries with potentially inaccurate terms. A computer network 102, such as a local area network (LAN), wide area network (WAN), the Internet, or a combination thereof, connects publisher web sites 104, client devices 106, and the search engine 110. The online environment 100 may include many thousands of publisher web sites 104 and client devices 106.

A web site 104 is a one or more web page resources 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

A resource is any data that can be provided by the publisher 104 over the network 102 and that is associated with a resource address. Resources include HTML pages, word processing documents, portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A client device 106 is an electronic device that is under the control of a user and is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The indexed and, optionally, cached copies of the resources are stored in an index 112.

The client devices 106 submit search queries 109 to the search engine 110. In response to the queries, the search engine 110 uses the index 112 to identify resources that are relevant to the queries. The search engine 110 identifies the resources in the form of search results 111 and returns the search results to the client devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval ("IR") scores, and optionally a separate ranking of each resource relative to other resources (e.g., an authority score). These scores and other scores may be combined for each resource to generate a search score for that resource. The search results are ordered according to these search scores and provided to the client device according to the order.

The client devices 106 receive the search results and render them for presentation to users. In response to the user selecting a search result at a client device 106, the client device 106 requests the resource identified by the resource locator included in the selected search result. The publisher of the web site 104 hosting the resource receives the request for the resource from the client device 106 and provides the resource to the requesting client device 106.

In addition to providing search results in response to queries, the search engine 110, by use of a query suggestion subsystem 118, provides query suggestions to a client device. The query suggestion subsystem 118 accesses the query logs 114 and determines a list of query suggestions based on search queries that have the query characters as a stem (or, alternatively or in addition, queries that are related by topic or co-occurrence). For example, the query suggestions can be suggestions based on frequency co-occurrence and query stemming of queries stored in query logs 114.

Query Corrections

As described above, the search system identifies potentially inaccurate terms in a query and generates a query correction. In some implementations, the search system 110 includes a query correction subsystem 130. The query correction subsystem 130 is implemented in a data processing apparatus of one or more computers that are programmed to perform the algorithmic processes described in the following sections.

Figure 2A:
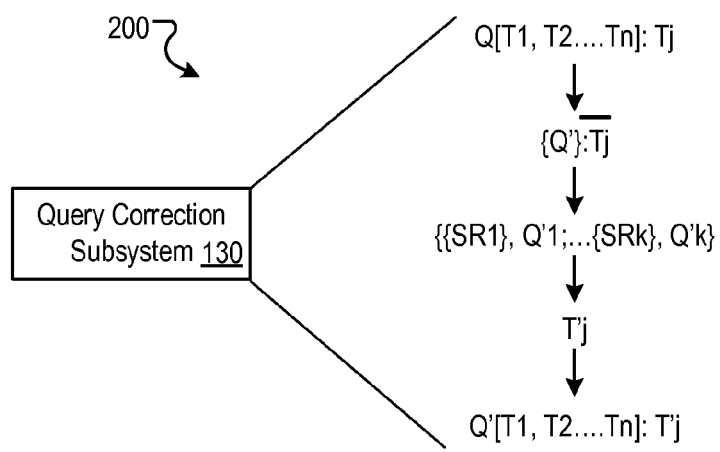
FIG. 2A is a data flow of an example process for determining a query correction for a query with a potentially inaccurate term.
Figure 2B:
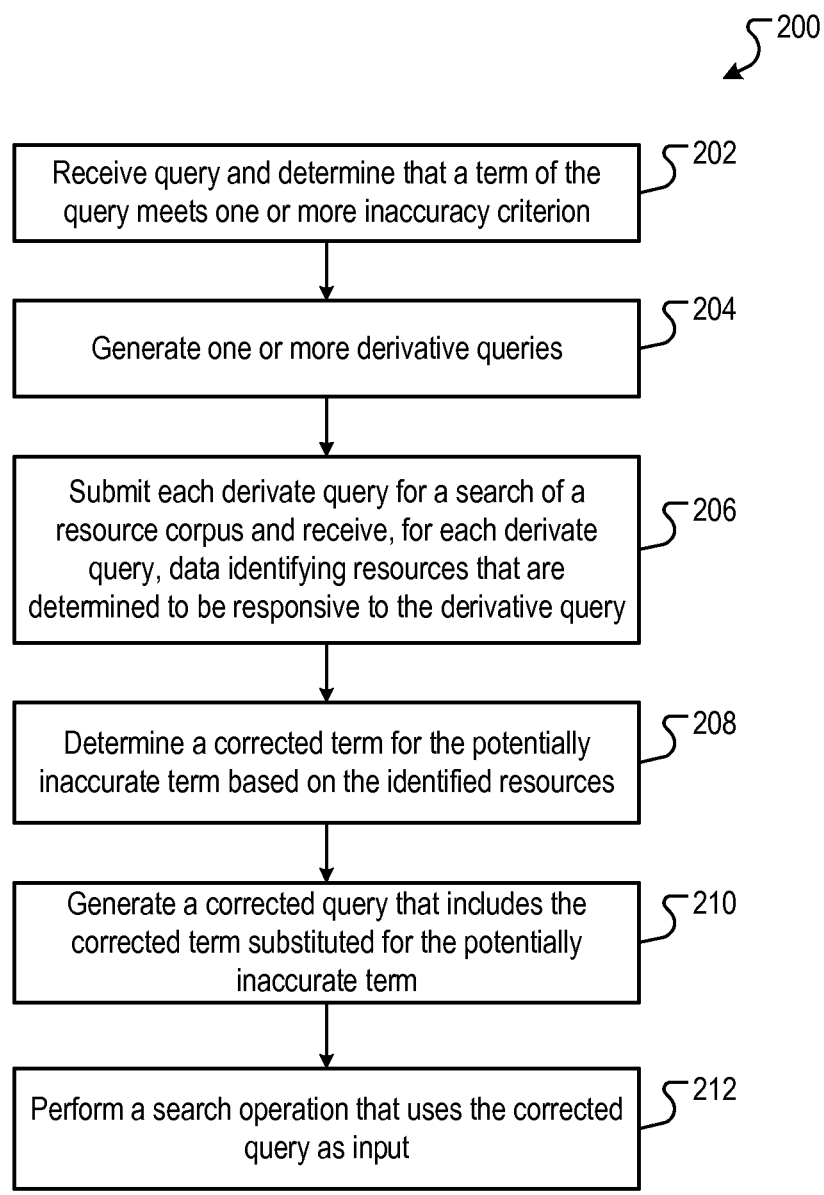
FIG. 2B is a flow diagram of the example process for determining a query correction for a query with a potentially inaccurate term.

Operation of the query correction subsystem 130 is described with respect to FIGS. 2A and 2B. In particular, FIG. 2A is a data flow of an example process 200 for determining a query correction for a query with a potentially inaccurate term, and FIG. 2B is a flow diagram of the example process 200 for determining a query correction for a query with a potentially inaccurate term. The process 200 can be implemented in the query correction subsystem.

In operation, the query correction subsystem 130 receives a query and determines that a term of the query meets one or more inaccuracy criterion (202). The inaccuracy criterion is a criterion that if met is indicative of the term of the query being a potentially inaccurate term in a context of the query. For example, with reference to FIG. 2A, the query Q having terms [T1 T2 . . . Tn] includes a potentially inaccurate term Tj.

There are several types of inaccuracy criterion that can be used. One criterion is a typographic error criterion. If a query term is determined to include a query term that has a typographic error (e.g., a misspelled term or a term that is not included in a term corpus), then the term may be potentially inaccurate. For example, a query may include the misspelled name of a person. A more detailed process flow relating to the processing of potentially inaccurate terms based on a typographic error criterion is described with reference to FIGS. 3A-3C.

Another criterion is a class criterion. If the term is an instance of a class of related terms that are determined to be commonly confused terms, then the term may be a potentially inaccurate term. For example, a query may include the name of a first broadcast network and the title of a television program. However, the television program may be broadcast on a different broadcast network. As the instances of broadcast networks belong to the class of broadcast networks, and the terms are often confused, the term having the name of the first broadcast network is determined to be potentially inaccurate. A more detailed process flow relating to the processing of potentially inaccurate terms based on a class criterion is described with reference to FIGS. 4A and 4B.

In response to the determination that the term is a potentially inaccurate term, the query correction subsystem 130 generates one or more derivative queries from the query (204). Each derivative query that is generated does not include the potentially inaccurate term. For example, with reference to FIG. 2A, one or more derivative queries {Q'} are generated, and each does not include the term Tj. An example of how derivative queries are created for the typographic error criterion is described with reference to FIG. 3B, and example of how derivative queries are created for the class criterion is described with reference to FIG. 4B.

The query correction subsystem 130 submits each derivative query for a search of a resource corpus and receives, for each derivative query, data identifying resources that are determined to be responsive to the derivative query (206). For example, with reference to FIG. 2A, each derivative query Q'1 . . . Q'k is submitted, and for each query a set of search results {SR} is returned. The data and the resources are used to evaluate candidate correction terms that are candidates for substitution of the potentially inaccurate term. An example of how the data and resources are processed for the typographic error criterion is described with reference to FIG. 3B, and example of how the data and resources are processed for the class criterion is described with reference to FIG. 4B.

The query correction subsystem 130 then determines a corrected term based on the identified resources (208). The corrected term is selected from among the candidate terms and is a term that is different from the potentially inaccurate term. For example, with reference to FIG. 2A, the correct term T'j is determined for the potentially inaccurate term Tj. An example of how the corrected term in selected for the typographic error criterion is described with reference to FIG. 3B, and example of how the corrected term is selected for the class criterion is described with reference to FIG. 4B.

The query correction subsystem 130 generates a corrected query that includes the terms of the query that are not the potentially inaccurate term and that includes the corrected term substituted for the potentially inaccurate term (210). For example, with reference to FIG. 2A, the corrected query Q' having terms [T1, T2 . . . T'j . . . Tn] is generated. The term T'j is substituted for the original term Tj.

In some implementations, the query correction subsystem 130 can also verify that the corrected query performs well, e.g., that the resources that are identified for the corrected query are of higher relevance (e.g., have higher search scores) than the resources identified for the original query; that the corrected query does not include a potentially inaccurate term; etc. An example verification process is described with reference to FIG. 3C.

The query correction subsystem 130 then performs a search operation that uses the corrected query as input and provides the results of the search operation to the user device in response to the query (212). One example search operation is a query suggestion operation. The query correction subsystem 130 generates a query suggestion that specifies the corrected query as a query suggestion, and provides the query suggestion to the user device in response to the query. For example, the query [T1, T2 . . . T'j . . . Tn] may be provided to the user device as a query suggestion.

Another example search operation is submitting the corrected query for a search of the resource corpus and receiving search results identifying resources that are determined to be responsive to the corrected query. A proper subset of the search results identifying resources that are determined to be responsive to the corrected query are then provided with search results identifying resources that are determined to be responsive to the query. For example, two or three search results responsive to the corrected query may be provided with search results responsive to the original query.

Typographic Query Corrections

Figure 3A:
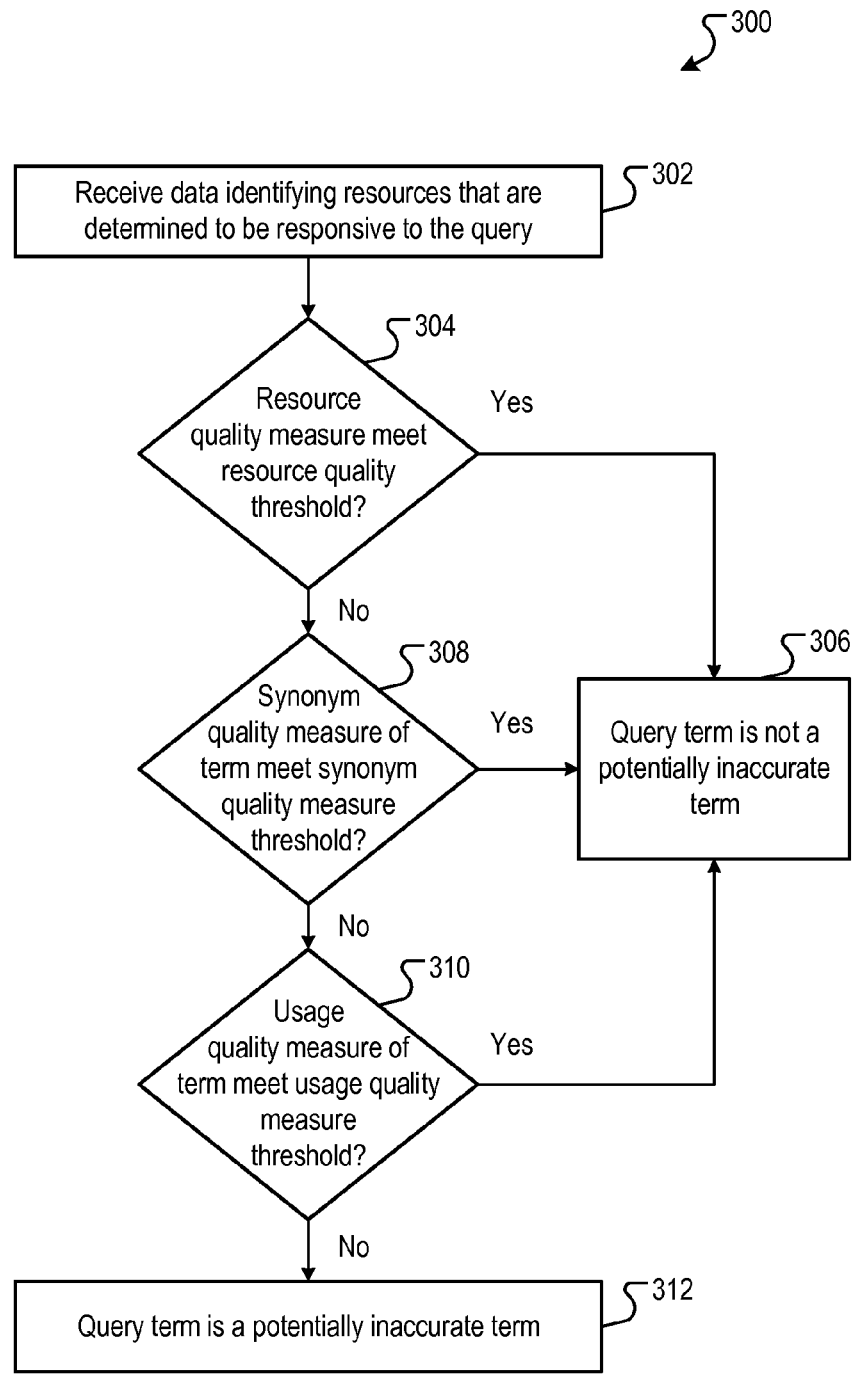
FIG. 3A is a flow diagram of an example process for determining that a query includes a potentially inaccurate term.
Figure 3B:
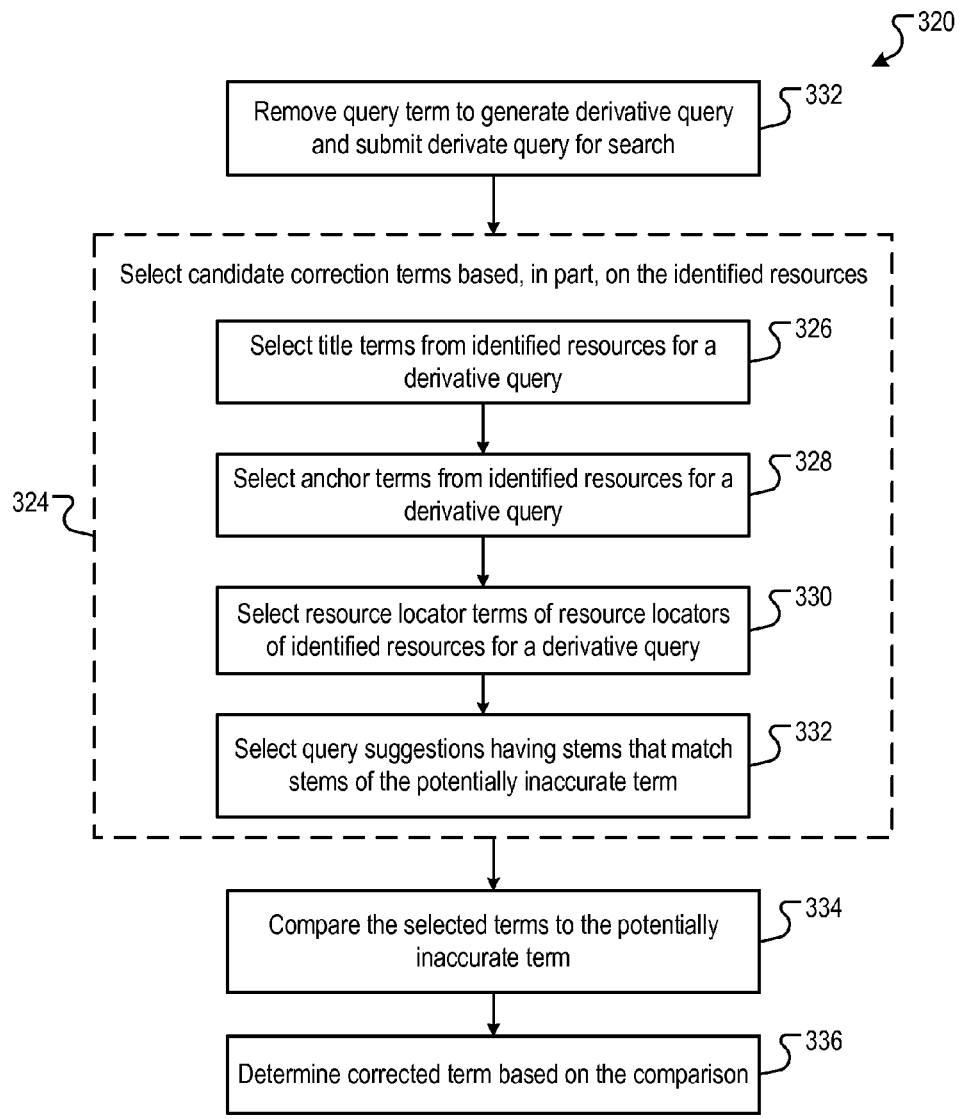
FIG. 3B is a flow diagram of an example process for selecting a correction term for the potentially inaccurate term.
Figure 3C:
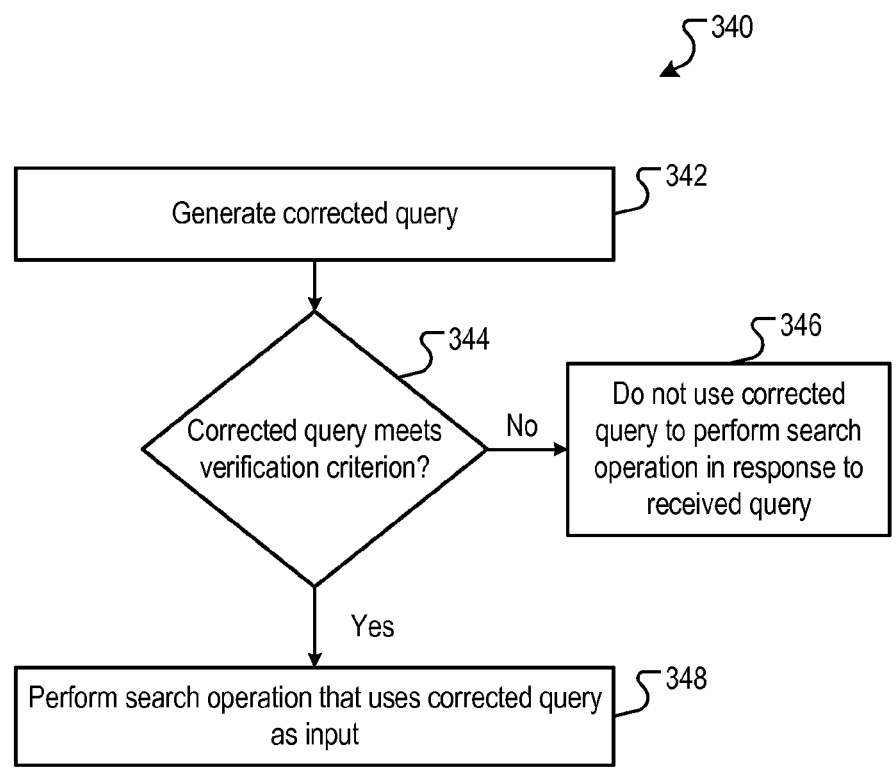
FIG. 3C is a flow diagram of an example process for validating a corrected query.

FIGS. 3A-3C describe example processes that are used for potentially inaccurate terms that result from typographic errors. As used herein, a typographic error in a query is an error that results in a misspelling of a term. The misspelled term may result in a term that is not in a term corpus (e.g., a dictionary or a query log), or may result in a term that is, in fact, correctly spelled but is a homophone, e.g., carat, caret, and carrot, or Nighoff and Nyhoff (the latter homophones being a case of surnames).

In some implementations, the mere presence of a query term that appears to be potentially inaccurate (e.g., the term is not in a dictionary or is a homophone) may be a trigger condition that is used to generate and process derivative queries. However, such a triggering condition may be expensive in terms of resource requirements, as many queries include such terms. Accordingly, in some implementations, the results of the query and the query terms may be evaluated to determine whether to further process the query. FIG. 3A is a flow diagram of one such example process 300 for determining that a query includes a potentially inaccurate term. The process 300 includes three different quality measures to determine whether a term is a potentially inaccurate term. However, the process 300 need not implement all of these sub-process, and can also implement other quality check processes as well.

The query correction subsystem 300 receives data identifying resources that are determined to be responsive to the original query (302). For example, the query correction subsystem 300 receives search results and search scores of the search results.

The query correction subsystem 130 determines whether a resource quality measure meets a resource quality threshold (304). The resource quality measure is a measure of quality of resources identified as being responsive to the query. The quality measure can be based on, for example, the number of resources identified, the search score of each identified resource (or a proper subset of the top N identified resources or top M % of identified resources). Any appropriate quality analysis process for a collection of identified resources can be used.

Quality analysis can be done, in some implementations, on a term-by-term basis. For example, if a particular term has a very low frequency of occurrence in the identified resources while the other terms occur at a much higher frequency, then only that particular term may be a potentially inaccurate term.

If the query correction subsystem 130 determines the resource quality measure meets the resource quality threshold, then the query term is determined to not be a potentially inaccurate term (306). However, if the query correction subsystem determines that resource quality measure does not meet the resource quality threshold, then the query correction subsystem determines whether a synonym quality measure meets a synonym quality measure for a term (308). The synonym quality measure is a measure of quality of synonym terms that are synonyms of the term. Each term can be evaluated, or only terms that appear to potentially inaccurate may be evaluated. As used herein, a synonym includes both terms that are synonyms of a term (e.g., "buy" and "purchase") and terms that map to a term (e.g., city abbreviations, such as "SF" and "San Francisco"). The synonym score may be proportion to the number of synonyms and/or the strength of the synonym relationships. The presence of a strong synonym score indicates that the term is likely not misspelled, and that the user has likely intentionally selected the particular term.

If the query correction subsystem 130 determines the synonym quality measure meets the synonym quality threshold, then the query term is determined to not be a potentially inaccurate term (306). However, if the query correction subsystem 130 determines that synonym quality measure does not meet the synonym quality threshold, then the query correction subsystem determines whether the usage quality measure meets a usage quality measure threshold (310). The usage quality measure threshold is a measure of quality of term usage of the synonym terms in the context of the resources.

The fact that a term may not have a strong synonym score is not necessarily dispositive of the term being potentially inaccurate. In particular, if a synonym of the term is used in a prevalent way (e.g., in many bigrams, in titles, etc.), then the term may not be inaccurate. This occurs, for example, as new terms emerge in a lexicon, or when a particular term has a distinct meaning to a small population of users.

The usage quality measure is based on the usage of the synonyms of the term in the resources. In some implementations, the usage quality measure takes into account term occurrence context (e.g., n-gram occurrences, adjacent term analysis, compound term analysis, occurrence of the term in identifiable phrases) and term occurrence importance (e.g., text formatting of the term, such as size, style and color, occurrence of the term in one or more of a resource title, resource anchor text, and the URL of the resource). Three example usage factors include a bigram usage factor, a title usage factor, and an anchor usage factor. The bigram usage of the synonym terms is the presence of the synonym terms in bigrams, and the usage quality measure is proportional to a number of occurrences of bigram usage of the synonym terms. For example, for the term "SF", the synonym "San Francisco" occurs in many frequent bigrams, e.g., "San Francisco Airport," San Francisco 49ers."

The title usage of the synonym terms is the presence of the synonym terms in a resource title. The usage quality measure is proportional to a number of occurrences of title usage of the synonym terms. For example, the use of a synonym of a term in a title of a resource is an indication that the term is not inaccurate, as its synonym likely has a distinct meaning.

The anchor usage of the synonym term is the presence of the synonym terms in anchor text of resource hyperlinks. The usage quality measure is proportional to a number of occurrences of anchor usage of the synonym terms. Again, the use of a synonym of a term in an anchor in a resource is an indication that the term is not inaccurate, as its synonym likely has a distinct meaning.

The three usage factors above are example usage factors, and more or fewer usage factors can also be evaluated. For example, any appropriate n-gram usage factor can be evaluated. Likewise, the presence of a synonym term in a URL can also be an indication that the term is not inaccurate, as can formatting of the term in a manner that causes the term to be prominently displayed with respect to other terms in the resource. Thus, one usage factor, or any appropriate combination of usage factors, can be used to measure the quality of term usage of the synonym terms in the context of the resources.

If the query correction subsystem 130 determines the usage quality measure meets the usage quality threshold, then the term is determined to not be a potentially inaccurate term (306). However, if the query correction subsystem 130 determines that usage quality measure does not meet the usage quality threshold, then the query term is determined to be a potentially inaccurate term (312).

FIG. 3B is a flow diagram of an example process for selecting a correction term for the potentially inaccurate term. In the case of a typographic error criterion, for example, the derivate queries include only the terms that are not the potentially inaccurate terms.

The query correction subsystem 130 removes a query term to generate a derivative query and submits the derivate query for a search (332). For example, if the query includes terms [A B C], and C is the potentially inaccurate term, then the derivative query is [A B]. This query is then submitted for a search of the resources.

In some implementations, however, if a query includes a potentially inaccurate term, then each term can be serially removed to generate derivative queries. For example, if the query includes terms [A B C], and C is the potentially inaccurate term, then the following derivative queries are generated: [A B], [A C], and [B C]. Each query is then submitted for a search of the resources.

The query correction subsystem 130 selects candidate correction terms based, in part, on the identified resources (324). Each result set is associated with the removed query term. For example, for the query [A B], the result set {SR}:AB is associated with the term C, and thus is used to identify candidate terms that can be used to replace the potentially inaccurate term C.

The candidate correction terms can, for example, be selected based on various usage features in the result set and, optionally, based on other data, such as query suggestions for the potentially inaccurate term. For example, process steps 326-332 are used to select the candidate terms. The process steps 326, 328 and 330 can be done for all identified resources in the result set, or on a proper subset of the top N identified resources or top M % of identified resources.

In particular, the query correction subsystem 130 selects, for a derivative query, title terms from the identified resources (326), anchor terms from identified resources (328), and resource locator terms from the resource locators of the identified resources (330). Common terms such as stop words, protocol specifiers (e.g., "http", "ftp"), and top-level domain attribute terms (e.g., ".com", ".org") can optionally be ignored.

Additionally, the query correction subsystem 130 can also generate candidate correction terms from term suggestions that match at a term stem of one or more characters of the potentially inaccurate term (332). Multiple stems from the potentially inaccurate term may be used, and one or more suggestions for each stem may be selected. For example, if the inaccurate term is "pealacna", then the following query suggestions may be selected: "pandora" (for the stem "p"), "people" (for the stem "pe"), "peach" (for the stem "pea"), and so on.

The query correction subsystem 130 compares the selected candidate correction terms to the potentially inaccurate term (334). The comparison may take into account a variety of appropriate selection factors. The factors may include edit distance between the potentially inaccurate term and the candidate correction term. Generally, the closer in edit distance a candidate correction term is to the potentially inaccurate term, the higher it will rank relative to other terms. Bigram usage of the candidate correction term is also a factor. For example, "Atlanta Falcons" is a common bigram. Assuming that the original query is "Schedule Pro Football Atlanta Flacuns", the close bigram match to the term "Atlanta Flacuns", and the common "Atlanta Falcons" bigram increases the confidence in the correction term "Falcons" than if the correction term only occurred in a unigram context. In other words, a resulting bigram in a corrected query matching multiple bigrams in the resources increases the confidence of the query correction.

Another factor that can be considers is phonetic similarity. A high phonetic similarity between two terms is also a signal of an appropriate correction. For example, for the term "Nighoff", the candidate correction term "Nyhoff" is very close in phonetic similarity. Accordingly, it may be scored higher than the candidate correction term "Nights Off" or "Wykoff".

Other comparison factors that can be consider are the number of occurrence of each candidate correction term in the identified resources, the types of occurrences (e.g., whether in the title, anchor, URL or body text), etc.

Based on the comparison, the query correction subsystem 130 determines a correction term (336). As described above, a variety of comparison techniques may be use—e.g., edit distance, topical similarity, phonetic similarity, usage statistics, etc. Depending on the technique used, different metric values are used to determine a corrected term. The corrected term is then substituted for the potentially inaccurate term in the query.

In some implementations, the corrected query is verified before it is used to provide information to the user. The verification step is an optional step, and is used to ensure that the corrected query offers at least a performance improvement over the original query.

FIG. 3C is a flow diagram of an example process 340 for validating a corrected query. The query correction subsystem 130 generates the corrected query (342), and determines whether the corrected query meets one or more verification criteria (344).

Any appropriate verification criterion can be used. For example, one verification criterion is that the query does not include any additional potentially inaccurate terms. In other words, the system ensures that one potentially inaccurate term is not replace with another potentially inaccurate term.

Another verification criterion is ensuring that a quality measure of the resources identified by the corrected query meets a resource quality threshold. The quality measure can be determined as described with respect to FIG. 2B above. The quality measure can be term based score for the correction term (e.g., how well the term is determined to perform with respect to the identified resources, based on, for example, various usage factors), an overall resource quality score for the set of identified resources, or a combination of these scores.

If the query correction subsystem 130 determines the corrected query does not meet the verification criteria, then the corrected query is not used to perform search operations in response to the query (346). Conversely, if the query correction subsystem 130 determines the corrected query does meet the verification criteria, then the corrected query is used to perform search operations in response to the query (346). As described above, the search operations can be a suggestion, the blending in of one or more search results responsive to the corrected query with the search results responsive to the original query, re-ordering search results responsive to the original query, etc.

Class Query Corrections

Another criterion is a class criterion. If a term of a query an instance of a class of related terms that are determined to be commonly confused terms, then the term may be a potentially inaccurate term. For example, a query may include the name of a first broadcast network and the title of a television program. However, the television program may be broadcast on a different broadcast network. As the instances of broadcast networks belong to the class of broadcast networks, and the terms are often confused, the term having the name of the first broadcast network is determined to be potentially inaccurate.

Figure 4A:
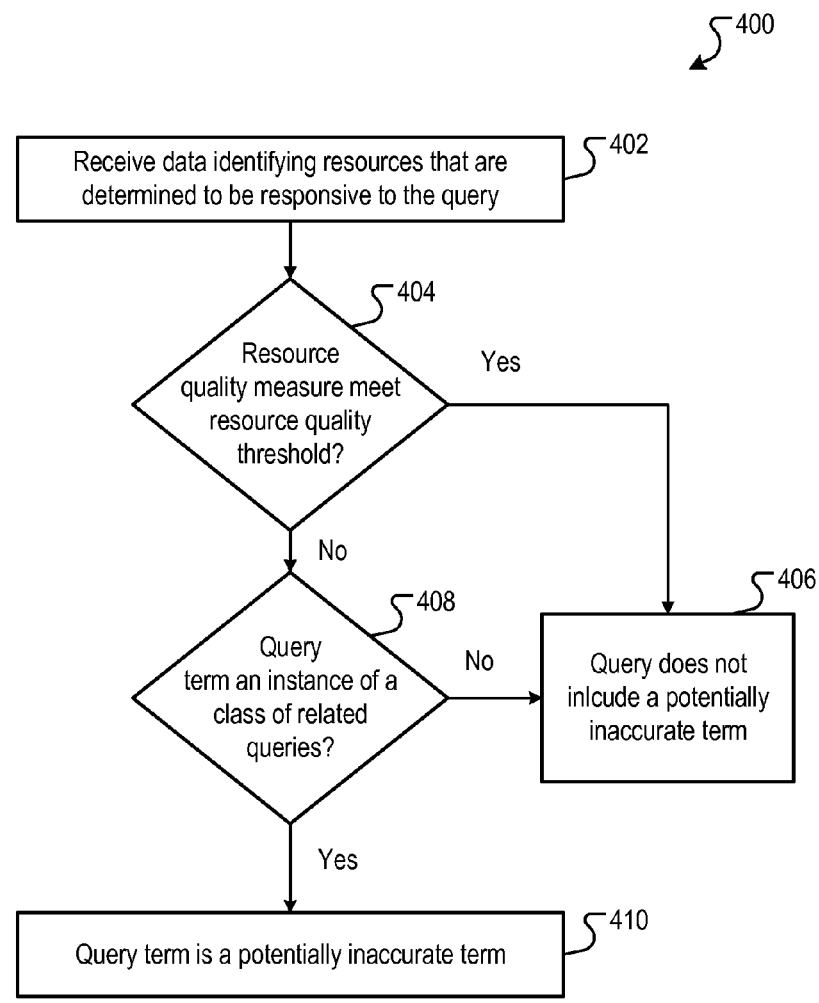
FIG. 4A is a flow diagram of another example process for determining that a query includes a potentially inaccurate term.
Figure 4B:
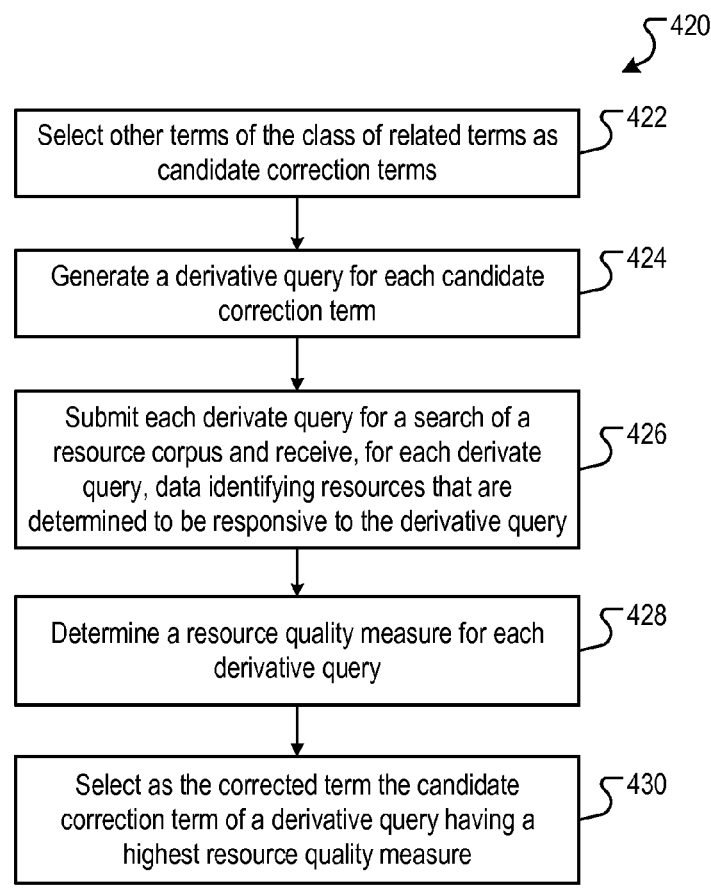
FIG. 4B is a flow diagram of another example process for selecting a correction term for the potentially inaccurate term Like reference numbers and designations in the various drawings indicate like elements.

FIG. 4A is a flow diagram of another example process 400 for determining that a query includes a potentially inaccurate term, and is used in process class query corrections. The query correction subsystem 130 receives data identifying resources that are determined to be responsive to the query (402). The query correction subsystem 130 then determines whether the resource quality measure of the results meets a resource quality threshold (404). The resource quality measure can be determined in a similar manner as described with reference to process step 304 in FIG. 3A above, except that different valuation thresholds may be used. For example, because the class terms are likely not misspelled, many of the resources responsive to the original query may be both high quality and relevant. Accordingly, the resource quality threshold used for class query corrections may be higher than the resource quality threshold used for typographic query corrections.

If the query correction subsystem 130 determines the resource quality measure meets the resource quality threshold, then the query is determined to not include a potentially inaccurate term (406). However, if the query correction subsystem determines that resource quality measure does not meet the resource quality threshold, then the query correction subsystem determines whether the query includes a query term that is an instance of a class of related queries (408). An example of a class of related query terms is television network stations. Often users confuse networks when issuing queries for television programs. For example, a very popular program, e.g., "The Voice," airs on NBC. However, many users submit queries that specify an incorrect network, e.g., [program schedule the voice AMC] or [program schedule the voice CBS].

If the query correction subsystem determines that the query does not include a query term that is an instance of a class of related queries, then the query is determined to not include a potentially inaccurate term (406).

However, if the query correction subsystem determines that the query does include a query term that is an instance of a class of related queries, then the query is determined to include a potentially inaccurate term (408). The query correction subsystem 130 then processes derivative queries. One such example process is described with respect to FIG. 4B, which is a flow diagram 420 of another example process for selecting a correction term for the potentially inaccurate term.

The query correction subsystem 130 selects other terms of the case of related terms as candidate correction terms (422) and generates a derivative query for each candidate correction term (424). For example, for the query [program schedule the voice AMC], the query correction subsystem 130 selects the terms CBS, ABC, NBC, etc., and generates the derivative queries [program schedule the voice CBS], [program schedule the voice ABC], [program schedule the voice NBC], etc.

The query correction subsystem 130 submits each derivate query for a search of a resource corpus and receives, for each derivate query, data identifying resources that are determined to be responsive to the derivative query (426). For example, the queries [program schedule the voice CBS], [program schedule the voice ABC], [program schedule the voice NBC], etc., are submitted, and for each query a set of search results {SR} is returned. The data and the resources are used to evaluate candidate correction terms that are candidates for substitution of the class instance term in the original query.

The query correction subsystem 130 determines a resource quality measure for each derivative query (428). The resource quality measure is determined from the resources responsive to the derivative query, and can be determined in the same manner as described above.

The query correction subsystem 130 selects as the corrected term the candidate correction term of a derivative query having a highest resource quality measure. For example, with respect to the queries [program schedule the voice CBS], [program schedule the voice ABC], [program schedule the voice NBC], the query [program schedule the voice NBC] returns a high quality, authoritative resource for the program "The Voice." The resource is also highly relevant to the query. The other queries—[program schedule the voice CBS], [program schedule the voice ABC]—also return high quality and authoritative resources. However, the resources overall are slightly less relevant to their respective derivative queries. Accordingly, the query [program schedule the voice NBC] has the highest resource quality measure, and is thus selected as the corrected query.

Additional Implementation Details

The typographic query corrections and class query corrections are examples of types of corrections that can be implemented by the systems and methods described in this specification. The systems and methods described in this application are not limited to these types of queries corrections, and other types of query corrections based on resources responsive to derivative queries can also be implemented. Accordingly, other appropriate criteria can be used to check for potentially inaccurate query terms.

In some implementations, multiple different types of criteria can be used to check for potentially inaccurate terms. For example, a query can be checked for both class query corrections and typographic query corrections.

Furthermore, if a query is determined to include more than one potentially inaccurate term, query corrections can be made for each potentially inaccurate term in a final corrected query.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a data processing apparatus, comprising:
   receiving an original query from a user device, the query including original query terms;
   receiving data identifying a set of web page resources that are determined to be responsive to the original query, each web page resource being a web page and identified by a corresponding URL address;
   determining, for the original query, a resource quality measure that is a measure of quality of the set of web page resources determined to be responsive to the original query;
   in response to determining that the resource quality measure does not meeting a resource quality measure threshold:
      determining, for each original query term of the query, a respective quality measure for the original query term, wherein each respective quality measure determined for an original query term is a quality measure that is different from the resource quality measure determined for the query;
      determining that an original query term of the original query term is a potentially inaccurate term based on the respective quality measure not meeting a respective quality measure threshold, and in response to determining that the original query term of the original query is a potentially inaccurate term:
         generating derivative queries from the original query, each derivative query not including the potentially inaccurate term;
         for each of the derivative queries, submitting the derivative query for a search of a resource corpus index of resources and receiving data identifying a respective set of resources that are determined to be responsive to the derivative query, wherein each resource is a web page resource hosted by a server and having a corresponding resource address;
         determining a corrected term that is different from the potentially inaccurate term based on the identified resources responsive to each of the one or more derivative queries, wherein the corrected term is determined independent of a set of resources identified as being responsive to the original query;
         generating a corrected query that that includes and the corrected term substituted for the potentially inaccurate term;
         performing a search operation that uses the corrected query as input; and
         providing results of the search operation to the user device in response to the original query.

2. The method of claim 1, wherein:
   determining that a term of the original query is a potentially inaccurate term comprises determining that the term is typographically incorrect; and
   generating one or more derivative queries from the original query comprises generating a derivative query that includes only the terms of the original query that are not the potentially inaccurate term.

3. The method of claim 2, wherein determining that the term is typographically incorrect comprises determining a synonym quality measure that is a measure of quality of synonym terms that are synonyms of the term does not meet a synonym quality measure threshold.

4. The method of claim 2, wherein determining that the term is typographically incorrect comprises determining a usage quality measure that is a measure of quality of term usage of synonym terms in the context of the resources.

5. The method of claim 4, wherein the usage quality measure is based on at least one of:
   bigram usage of the synonym terms in the context of the resources, the bigram usage being the presence of the synonym terms in bigrams, and wherein the usage quality measure is proportional to a number of occurrences of bigram usage of the synonym terms;
   title usage of the synonym terms, the title usage being the presence of the synonym terms in a resource title, and wherein the usage quality measure is proportional to a number of occurrences of title usage of the synonym terms; and
   anchor usage of the synonym terms, the anchor usage being the presence of the synonym terms in anchor text of resource hyperlinks, and wherein the usage quality measure is proportional to a number of occurrences of anchor usage of the synonym terms.

6. The method of claim 1, wherein determining a corrected term based on the identified resources comprises:
   generating candidate correction terms from terms that are included in the identified resources for a derivative query;
   determining, for each of the candidate correction terms, a similarity measure that measures the similarity of the candidate correction term to the potentially inaccurate term; and
   selecting as the corrected term the candidate correction term with a similarity measure that indicates a highest similarity relative to the other candidate correction terms.

7. The method of claim 6, further comprising generating candidate correction terms from uniform resource locator terms included in uniform resource locators of resources.

8. The method of claim 6, the operations further comprising generating candidate correction terms from term suggestions that match at a term stem of one or more characters of the potentially inaccurate term.

9. The method of claim 1, wherein determining that a term of the original query meets an inaccuracy criterion comprises determining that the term is an instance of a class of related terms, wherein the class of related terms are terms that are determined to be commonly confused terms;
   further comprising selecting each of the other terms that belong to the class as a candidate correction term; and
   generating one or more derivative queries from the original query comprises generating, for each of the candidate correction term, a derivative query that includes only the terms of the original query that are not the potentially inaccurate term and the candidate correction term.

10. The method of claim 1, wherein determining a corrected term based on the identified resources comprises:
   for each derivative query, determining a resource quality measure that is a measure of quality of resources identified as being responsive to the derivative query;
   selecting as the corrected term the candidate correction term of a derivative query having a resource quality measure that indicates a highest quality relative to the other derivative queries.

11. The method of claim 1, wherein:
   performing a search operation that uses the corrected query as input comprises submitting the corrected query for a search of the resource corpus and receiving search results identifying resources that are determined to be responsive to the corrected query; and providing results of the search operation to the user device in response to the original query comprises provide a proper subset of the search results identifying resources that are determined to be responsive to the corrected query with search results identifying resources that are determined to be responsive to the original query.

12. A system comprising:
a data processing apparatus; and
a non-transitory computer storage medium encoded with a computer program, the program comprising data processing apparatus instructions that when executed by the data processing apparatus cause the data processing apparatus to perform operations comprising:
receiving an original query from a user device, the query including original query terms;
receiving data identifying a set of web page resources that are determined to be responsive to the original query, each web page resource being a web page and identified by a corresponding URL address;
determining, for the original query, a resource quality measure that is a measure of quality of the set of web page resources determined to be responsive to the original query;
in response to determining that the resource quality measure does not meeting a resource quality measure threshold:
determining, for each original query term of the query, a respective quality measure for the original query term, wherein each respective quality measure determined for an original query term is a quality measure that is different from the resource quality measure determined for the query;
determining that an original query term of the original query term is a potentially inaccurate term based on the respective quality measure not meeting a respective quality measure threshold, and in response to determining that the original query term of the original query is a potentially inaccurate term:
generating derivative queries from the original query, each derivative query not including the potentially inaccurate term;
for each of the derivative queries, submitting the derivative query for a search of a resource corpus index of resources and receiving data identifying a respective set of resources that are determined to be responsive to the derivative query, wherein each resource is a web page resource hosted by a server and having a corresponding resource address;
determining a corrected term that is different from the potentially inaccurate term based on the identified resources responsive to each of the one or more derivative queries, wherein the corrected term is determined independent of a set of resources identified as being responsive to the original query;
generating a corrected query that that includes the corrected term substituted for the potentially inaccurate term;
performing a search operation that uses the corrected query as input; and
providing results of the search operation to the user device in response to the original query.

13. The system of claim 12, wherein determining that a term of the original query is a potentially inaccurate term comprises determining that a resource quality measure that is a measure of quality of resources identified as being responsive to the original query does not meet a resource quality measure threshold.

14. The system of claim 12, wherein:
determining that a term of the original query is a potentially inaccurate term comprises determining that the term is typographically incorrect; and
generating one or more derivative queries from the original query comprises generating a derivative query that includes only the terms of the original query that are not the potentially inaccurate term.

15. The system of claim 14, wherein determining that the term is typographically incorrect comprises determining a synonym quality measure that is a measure of quality of synonym terms that are synonyms of the term does not meet a synonym quality measure threshold.

16. The system of claim 14, wherein determining that the term is typographically incorrect comprises determining a usage quality measure that is a measure of quality of term usage of synonym terms in the context of the resources.

17. The system of claim 12, wherein determining a corrected term based on the identified resources comprises:
generating candidate correction terms from terms that are included in the identified resources for a derivative query;
determining, for each of the candidate correction terms, a similarity measure that measures the similarity of the candidate correction term to the potentially inaccurate term; and
selecting as the corrected term the candidate correction term with a similarity measure that indicates a highest similarity relative to the other candidate correction terms.

18. A non-transitory computer storage medium apparatus encoded with a computer program, the program comprising data processing apparatus instructions that when executed by the data processing apparatus cause the data processing apparatus to perform operations comprising:
receiving an original query from a user device, the query including original query terms;
receiving data identifying a set of web page resources that are determined to be responsive to the original query, each web page resource being a web page and identified by a corresponding URL address;
determining, for the original query, a resource quality measure that is a measure of quality of the set of web page resources determined to be responsive to the original query;
in response to determining that the resource quality measure does not meeting a resource quality measure threshold:
determining, for each original query term of the query, a respective quality measure for the original query term, wherein each respective quality measure determined for an original query term is a quality measure that is different from the resource quality measure determined for the query;
determining that an original query term of the original query term is a potentially inaccurate term based on the respective quality measure not meeting a respective quality measure threshold, and in response to determining that the original query term of the original query is a potentially inaccurate term:
generating derivative queries from the original query, each derivative query not including the potentially inaccurate term;
for each of the derivative queries, submitting the derivative query for a search of a resource corpus index of resources and receiving data identifying a respective set of resources that are determined to be responsive to the derivative query, wherein each resource is a web page resource hosted by a server and having a corresponding resource address;

determining a corrected term that is different from the potentially inaccurate term based on the identified resources responsive to each of the one or more derivative queries, wherein the corrected term is determined independent of a set of resources identified as being responsive to the original query;

generating a corrected query that that includes the corrected term substituted for the potentially inaccurate term;

performing a search operation that uses the corrected query as input; and providing results of the search operation to the user device in response to the original query.

* * * * *